(12) United States Patent
Yamashita

(10) Patent No.: US 6,309,079 B1
(45) Date of Patent: Oct. 30, 2001

(54) DISPLAY SYSTEM HAVING A NON-LUMINESCENT DISPLAY DEVICE AND A LIGHT SOURCE AND METHOD OF ILLUMINATION TO DISPLAY AREA

(75) Inventor: Syunichi Yamashita, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/327,596

(22) Filed: Jun. 8, 1999

(30) Foreign Application Priority Data

Jun. 8, 1998 (JP) .................................................. 10-158908

(51) Int. Cl.[7] .................................................. G01D 11/28
(52) U.S. Cl. .............................. 362/27; 362/31; 362/559; 362/560; 362/561; 362/297
(58) Field of Search .............................. 362/27, 31, 559, 362/560, 561, 297, 296, 298

(56) References Cited

U.S. PATENT DOCUMENTS 5,335,100 * 8/1994 Obata ........................................ 359/49
5,751,386 * 5/1998 Kanda et al. ........................... 349/65
6,000,812 * 12/1999 Freeman et al. ....................... 362/249

FOREIGN PATENT DOCUMENTS

| 561329 A1 | * 9/1992 | (EP) | .................................. F21V/8/00 |
| 59-194781 | 12/1984 | (JP) | . |
| 3-16128 | 2/1991 | (JP) | . |
| 5-80328 | 4/1993 | (JP) | . |
| 7-333606 | 12/1995 | (JP) | . |
| 10-123518 | 5/1998 | (JP) | . |
| 10-268306 | 10/1998 | (JP) | . |
| 10-268308 | 10/1998 | (JP) | . |
| 10-301109 | 11/1998 | (JP) | . |
| 10-311979 | 11/1998 | (JP) | . |

* cited by examiner

Primary Examiner—Thomas M. Sember
Assistant Examiner—Ali Alavi
(74) Attorney, Agent, or Firm—Young & Thompson

(57) ABSTRACT

The present invention provides an illumination system for illuminating a light onto a display area of a display surface of a non-luminescent display device, wherein the illumination system is positioned outside of the display area and in a vicinity of an edge portion of the display surface, so that any part of the illumination system does not cover the display area.

4 Claims, 13 Drawing Sheets

DISPLAY SYSTEM HAVING A NON-LUMINESCENT DISPLAY DEVICE AND A LIGHT SOURCE AND METHOD OF ILLUMINATION TO DISPLAY AREA

BACKGROUND OF THE INVENTION

The present invention relates to a display, and more particularly to a display system having a non-luminescent display device such as a liquid crystal display and a light source, and a method of illumination to a display area of the non-luminescent display device.

Non-luminescent display devices such as liquid crystal displays have been used as thin display devices, wherein the display forms images which are displayed with illuminations. The following methods for illuminations have been available.

The first illumination method is as illustrated in FIG. 1 which is a fragmentary cross sectional elevation view illustrative of a reflection of a natural light by a reflecting plate on a bottom of a display device A display device 101 has a display surface and a back surface facing to a reflecting plate 103. A natural light 111 is incident from the display surface into the display device 101 at an oblique angle to the display surface The incident light 111 reaches a surface of the reflecting plate 103 and is then reflected thereby. The reflected light is transmitted through the display device 101.

The above first illumination method has the following problems. This method utilizes only the natural light, for which reason this first conventional method is inapplicable to a dark place or a weak natural light place The natural light is attenuated upon transmission thereof through the non-luminescent display device. As described above, the natural light is incident into the non-luminescent display device and then reflected by the reflecting plate before the reflected light is further transmitted through the non-luminescent display device, for which reason the natural light is attenuated two times, whereby it is difficult to obtain a sufficient intensity of the display light.

The second illumination method is as illustrated in FIG. 2 which is a fragmentary cross sectional elevation view illustrative of a transmission of an illumination light from an opposite surface to a display surface of a display device. A light source 102 is positioned to face an opposite surface to a display surface of a display device so that an illumination light 112 as emitted from the light source 102 is transmitted from the opposite surface to the display surface of the display device 101.

The above second illumination method has the following problems, This method requires the light source to always remain ON for obtaining a sufficient intensity of the display light, for which reason it is difficult to respond to the requirement for a possible reduction in a power consumption of the display.

The third illumination method is as illustrated in FIG. 3 which is a fragmentary cross sectional elevation view illustrative of a combination of the above first and second methods, wherein a reflecting plate 103 is provided on an opposite surface to a display surface of a display device 101 and a light surface 102 is positioned in a back side of the reflecting plate 103, so that a natural light 111 is incident from the display surface into the display device 101 at an oblique angle to the display surface. The incident light 111 reaches a surface of the reflecting plate 103 and is then reflected thereby. The reflected light 111 is transmitted through the display device 101. Further, an illumination light 112 as emitted from the light source 102 is transmitted from the opposite surface to the display surface of the display device 101. The reflecting plate 103 is semi-transparent to the light so that the reflecting plate 103 is capable of reflecting the natural light 111 and also allowing the illumination light 112 to be transmitted through the reflecting plate 103.

The above third illumination method has the following problems. The light reflecting plate is semi-transparent for responding to the conflict requirements for transmission of the illumination light through the light reflecting plate and reflection of the natural light by the light reflecting plate. This means it difficult to obtain high reflectivity and transparency. The efficiency in use of the illumination and the natural light is low The display can not exhibit such the required high display performance.

The fourth illumination method is as illustrated in FIG. 4 which is a fragmentary cross sectional elevation view illustrative of another combination of the above first and second methods, wherein combined two multiple window plates 603 are provided on an opposite surface to a display surface of a display device 101 and a light surface 102 is positioned in a back side of the combined two multiple window plates 603. Each of the combined two multiple window plates 603 has windows. The two multiple window plates 603 are allowed to be displaced from each other or relatively move to each other so that the individual multiple windows of the two multiple window plates 603 are alternately positioned, whereby no overlap is formed between the individual multiple windows of the two multiple window plates 603, and also so that the individual multiple windows of the two multiple window plates 603 are aligned, whereby overlaps are formed between the individual multiple windows of the two multiple window plates 603, thereby forming windows penetrating the two multiple window plates 603. A natural light 111 is incident from the display surface into the display device 101 at an oblique angle to the display surface. The incident light 111 reaches a surface of the combined two multiple window plates 603 and is then reflected thereby, wherein the combined two multiple window plates 603 are displaced from each other so that the individual multiple windows of the two multiple window plates 603 are alternately positioned, whereby no overlap is formed between the individual multiple windows of the two multiple window plates 603, thereby forming no window penetrating the two multiple window plates 603. The reflected light 111 is then transmitted through the display device 101. Further, an illumination light 112 as emitted from the light source 102 is transmitted through the two multiple window plates 603 and then through the display device 101, wherein the combined two multiple window plates 603 are displaced from each other so that the individual multiple windows of the two multiple window plates 603 are aligned, whereby overlaps are formed between the individual multiple windows of the two multiple window plates 603, thereby forming windows penetrating the two multiple window plates 603 in order to allow the illumination light 112 to be transmitted through the overlapped windows of the two multiple window plates 603. This conventional method is disclosed in Japanese laid-open utility model publication No 59-194781.

The above fourth illumination method has the following problems. The multiple windows of the two multiple window plates 603 are defined by grids. Namely, the body of each of the two multiple window plates 603 comprises grids which define the windows Even if the two multiple window plates 603 are displaced so that the individual windows of the two multiple window plates 603 are just overlapped, then the illumination light is partially shielded by this grid portion. This means it difficult to improve the efficiency in use of the illumination light. Further, a driver and a controller are required to relatively move the two multiple window plates 603 under precise controls in position Actually, a system having the driver and the controller is required to be provided, whereby another problem with increase in the cost is also raised.

The fifth illumination method is as illustrated in FIG. 5 which is a fragmentary cross sectional elevation view illustrative of still another combination of the above first and second methods, wherein a reflecting flexible thin film 103 is provided on an opposite surface to a display surface of a display device 101 and a light surface 102 is positioned in a back side of the reflecting flexible thin film 103 The reflecting flexible thin film 103 can be wound and leaded, so as to adjust the reflection and transmission of the natural light. This conventional method is disclosed in Japanese laid-open patent publication No. 5-80328.

The above fifth illumination method has the following problems. The reflecting flexible thin film 103 is wound and leaded. This means it required to provide a system for wining and leading the reflecting flexible thin film 103 under precise control whereby another problem with increase in the cost is also raised.

The sixth illumination method is as illustrated in FIG. 6 which is a fragmentary cross sectional elevation view illustrative of a sixth conventional non-luminescent display device, wherein a light source and an optical guide 11 are provided. The optical guide 11 is plate-shaped and positioned so as to cover an entire of a displaying surface of the non-luminescent device. The light source 12 is positioned in one side of the optical guide 11 so that a light as emitted from the light source 12 is transmitted and guided through the optical guide 11 and irradiated onto the entire display surface of the non-luminescent device. This sixth illumination method is disclosed in Japanese laid-open patent publication No. 10-123518.

The sixth illumination method has the following problems. The above mentioned position of the optical guide 11 causes reductions in transparency of the displaying light and in the efficiency in use of the light.

The seventh illumination method is as illustrated in FIG. 7 which is a fragmentary cross sectional elevation view illustrative of a seventh conventional non-luminescent display device, wherein a light source 22 is provided on a back surface of an optical guide plate 4. The optical guide plate 4 is plate-shaped and positioned so as to cover an entire of a displaying surface of the non-luminescent device. A light as emitted from the light source 22 is guided through the optical guide plate 4 and irradiated onto the entire display surface of the non-luminescent device. This seventh illumination method is disclosed in Japanese laid-open patent publication No. 7-333606.

The seventh illumination method has the following problems. The above mentioned position of the optical guide 11 causes reductions in transparency of the displaying light and in the efficiency in use of the light.

The eighth illumination method is as illustrated in FIG. 8 which is a fragmentary cross sectional elevation view illustrative of an eighth conventional non-luminescent display device, wherein a light source 9 and a prism 8 are provided. The prism 8 is positioned so as to cover an entire of a displaying surface of the non-luminescent device. The light source 9 is positioned in one side of the prism 8 so that a light as emitted from the light source 9 is transmitted and guided through the prism 8 and irradiated onto the entire display surface of the non-luminescent device. This eighth illumination method is disclosed in Japanese laid-open utility model publication No. 3-16128.

The eighth illumination method has the following problems. The above mentioned position of the prism 8 causes reductions in transparency of the displaying light and in the efficiency in use of the light.

In the above circumstances, it had been required to develop a novel non-luminescent display device free from the above problems.

SUMMARY OF THE INVENTION

Accordingly, it is an object of the present invention to provide a novel non-luminescent display device free from the above problems.

It is a further object of the present invention to provide a novel non-luminescent display device exhibiting high display performances free from a brightness of circumferences.

It is a still further object of the present invention to provide a novel non-luminescent display device with an improved illumination device for illumination to a display surface of the display device.

It is yet a further object of the present invention to provide a novel non-luminescent display device which allows a possible reduction in the manufacturing cost.

It is a further more object of the present invention to provide a novel non-luminescent display device which allows high efficiency in use of the light.

It is still more object of the present invention to provide a novel non-luminescent display device which allows high reflectivity and transparency It is moreover object of the present invention to provide a novel non-luminescent display device which allows a possible reduction in power consumption.

It is another object of the present invention to provide a novel method of illumination to a display surface of a display device free from the above problems.

It is still another object of the present invention to provide a novel method of illumination to a display surface of a display device exhibiting high display performances free from a brightness of circumferences.

It is yet another object of the present invention to provide a novel method of illumination to a display surface of a display device with an improved illumination device for illumination to a display surface of the display device.

It is further another object of the present invention to provide a novel method of illumination to a display surface of a display device which allows a possible reduction in the manufacturing cost.

It is an additional object of the present invention to provide a novel method of illumination to a display surface of a display device which allows high efficiency in use of the light.

It is a still additional object of the present invention to provide a novel method of illumination to a display surface of a display device which allows high reflectivity and transparency.

It is yet an additional object of the present invention to provide a novel method of illumination to a display surface of a display device which allows a possible reduction in power consumption.

The present invention provides an illumination system for illuminating a light onto a display area of a display surface of a non-luminescent display device, wherein the illumination system is positioned outside of the display area and in a vicinity of an edge portion of the display surface, so that any part of the illumination system does not cover the display area.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
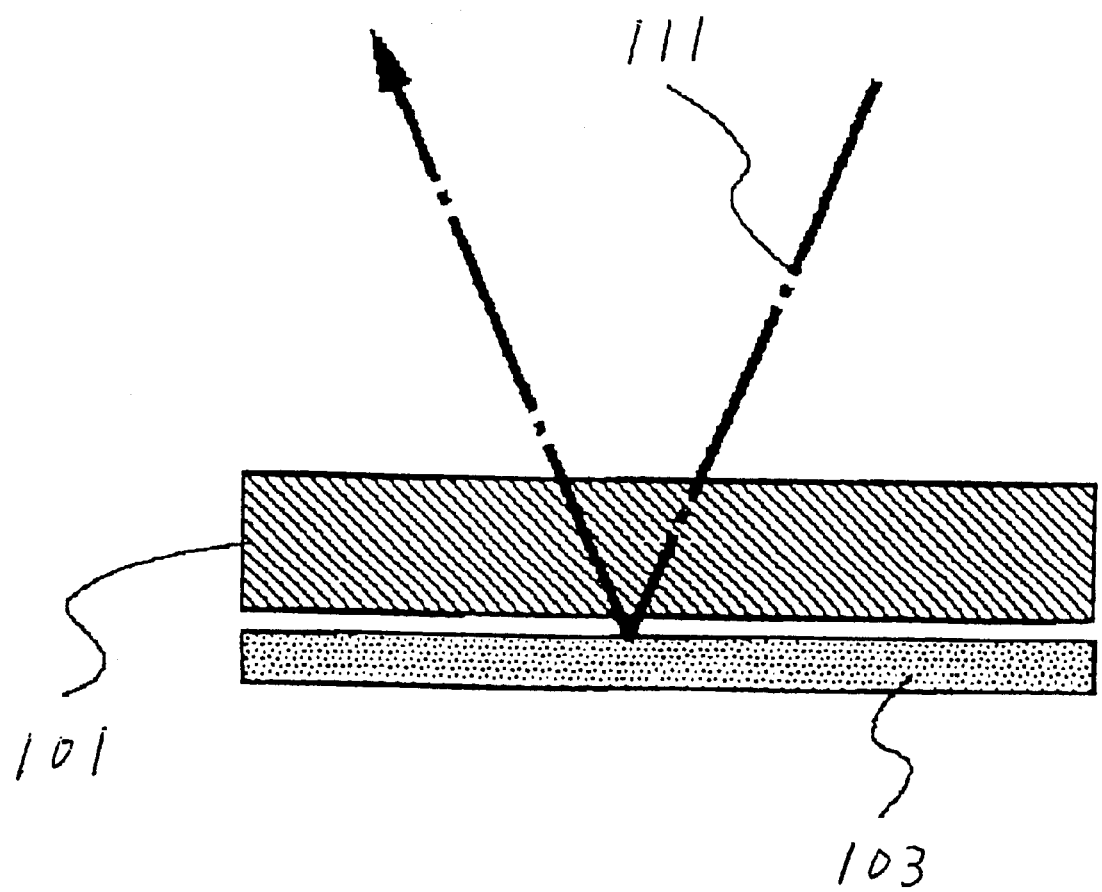
FIG. 1 is a fragmentary cross sectional elevation view illustrative of a reflection of a nature light by a reflecting plate on a bottom of a display device.
Figure 2:
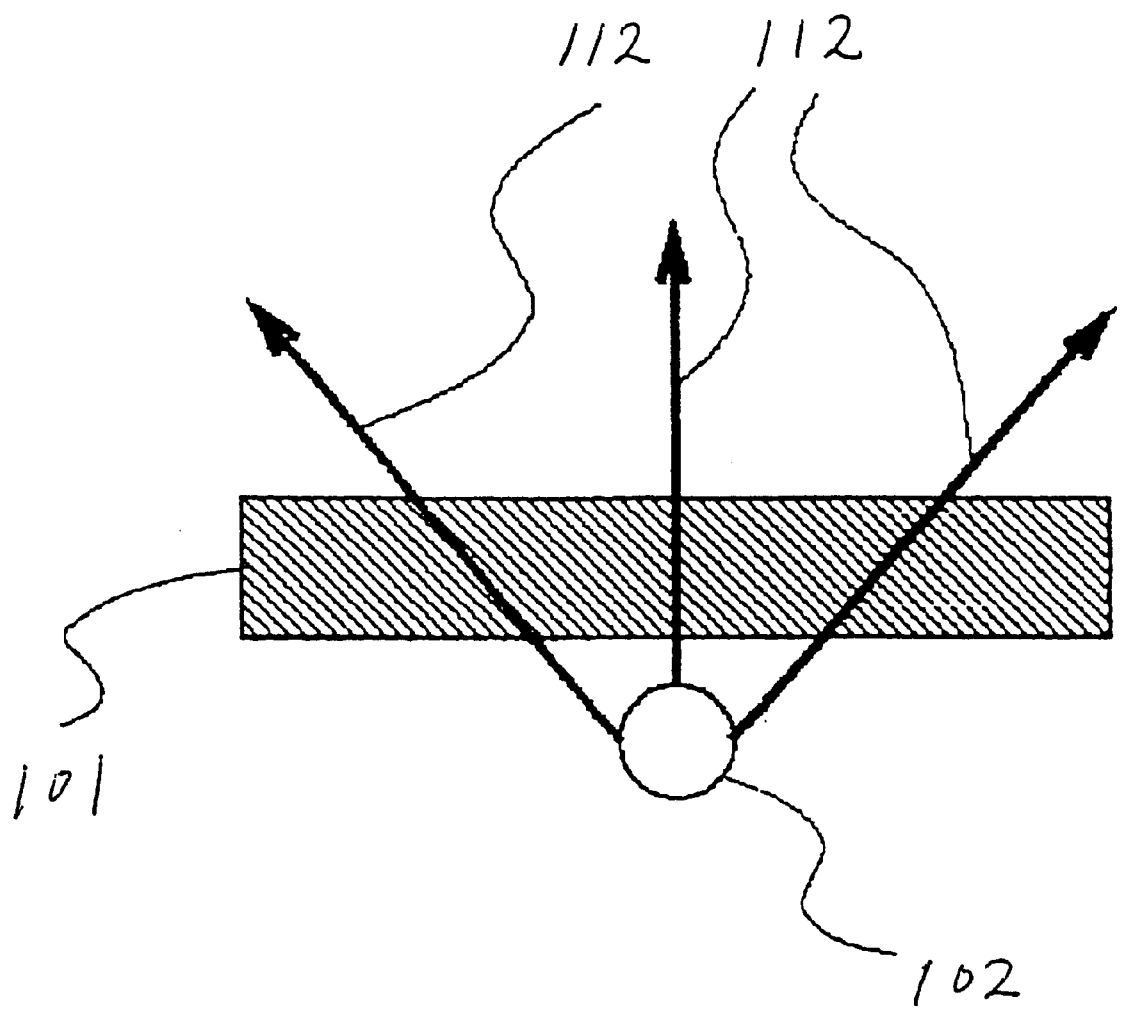
FIG. 2 is a fragmentary cross sectional elevation view illustrative of a transmission of an illumination light from an opposite surface to a display surface of a display device.
Figure 3:
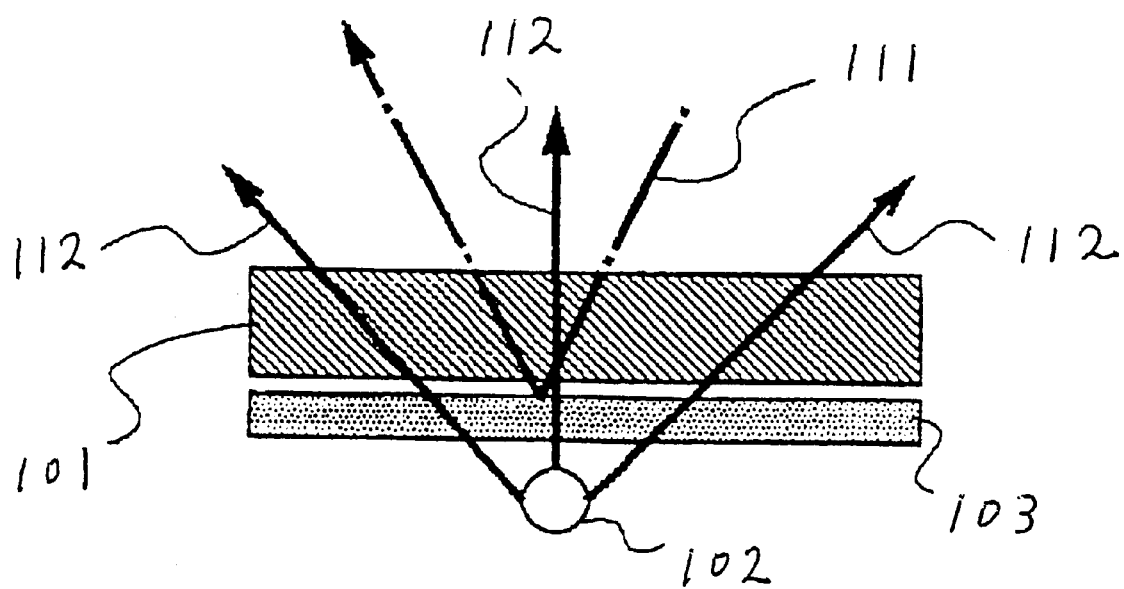
FIG. 3 is a fragmentary cross sectional elevation view illustrative of a combination of the above first and second methods.
Figure 4:
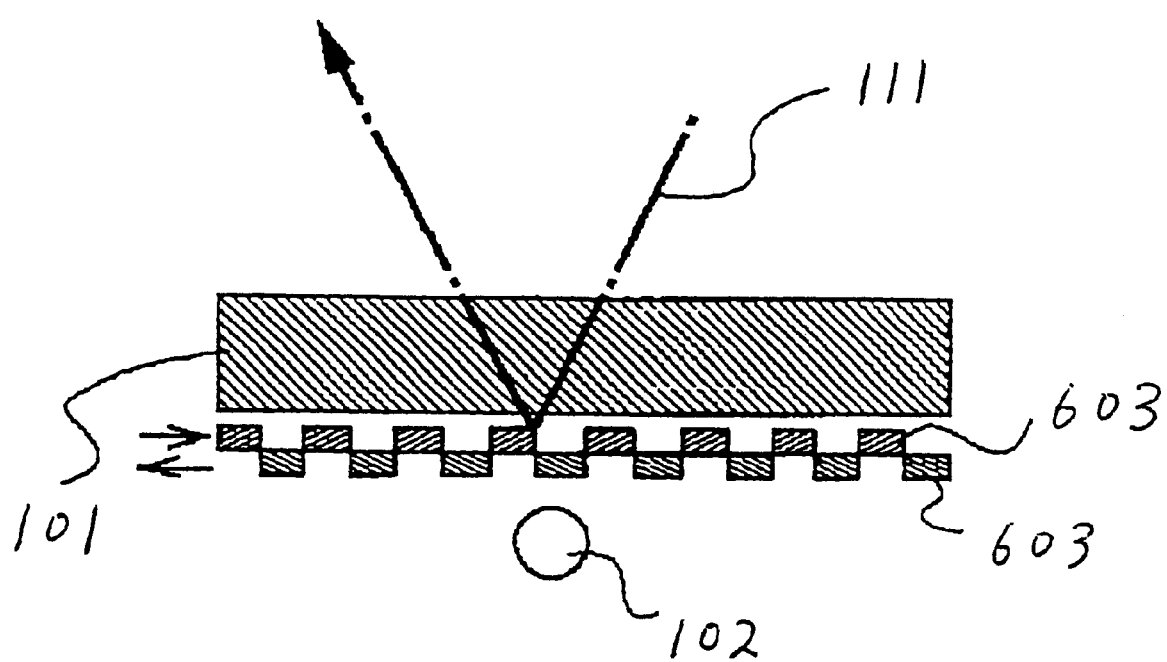
FIG. 4 is a fragmentary cross sectional elevation view illustrative of another combination of the above first and second methods.
Figure 5:
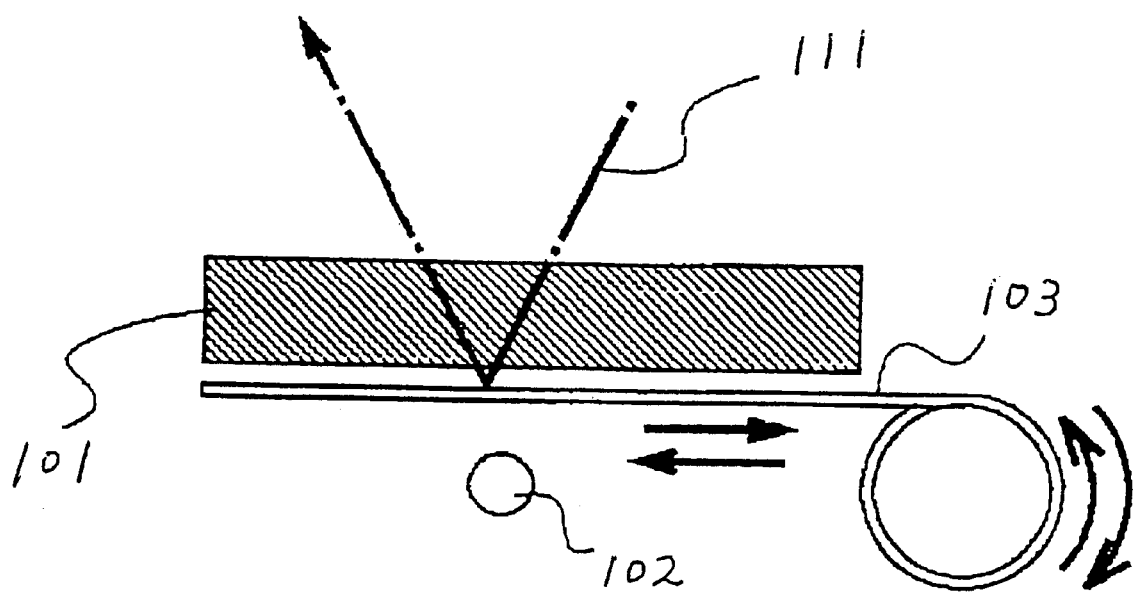
FIG. 5 is a fragmentary cross sectional elevation view illustrative of still another combination of the above first and second methods.
Figure 6:
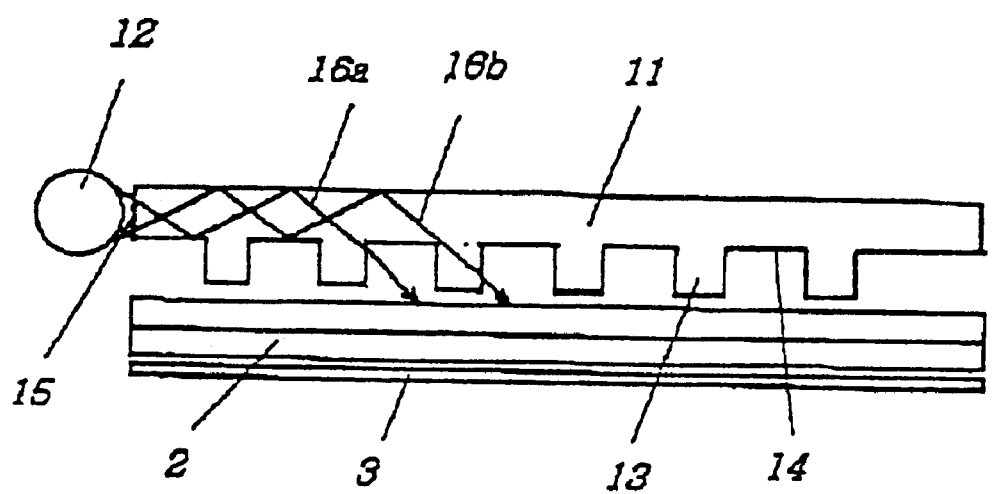
FIG. 6 is a fragmentary cross sectional elevation view illustrative of a sixth conventional non-luminescent display device.
Figure 7:
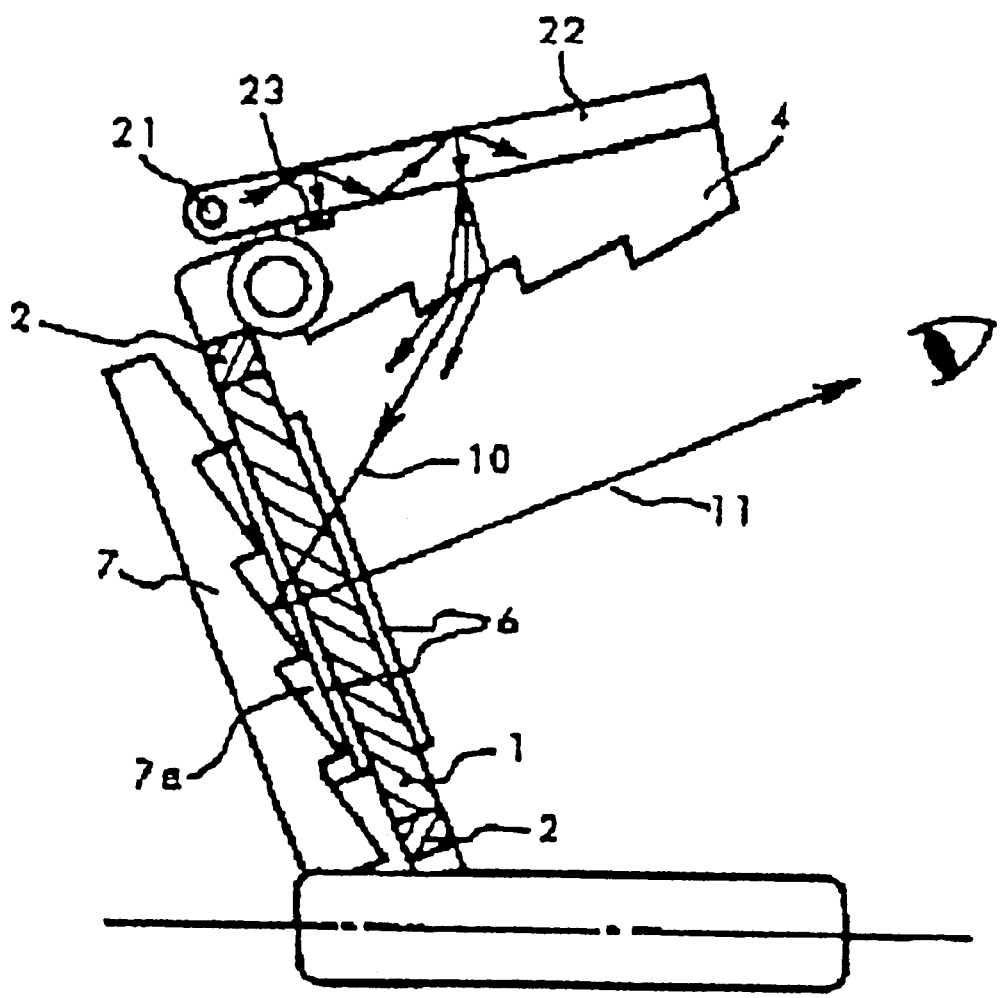
FIG. 7 is a fragmentary cross sectional elevation view illustrative of a seventh conventional non-luminescent display device.
Figure 8:
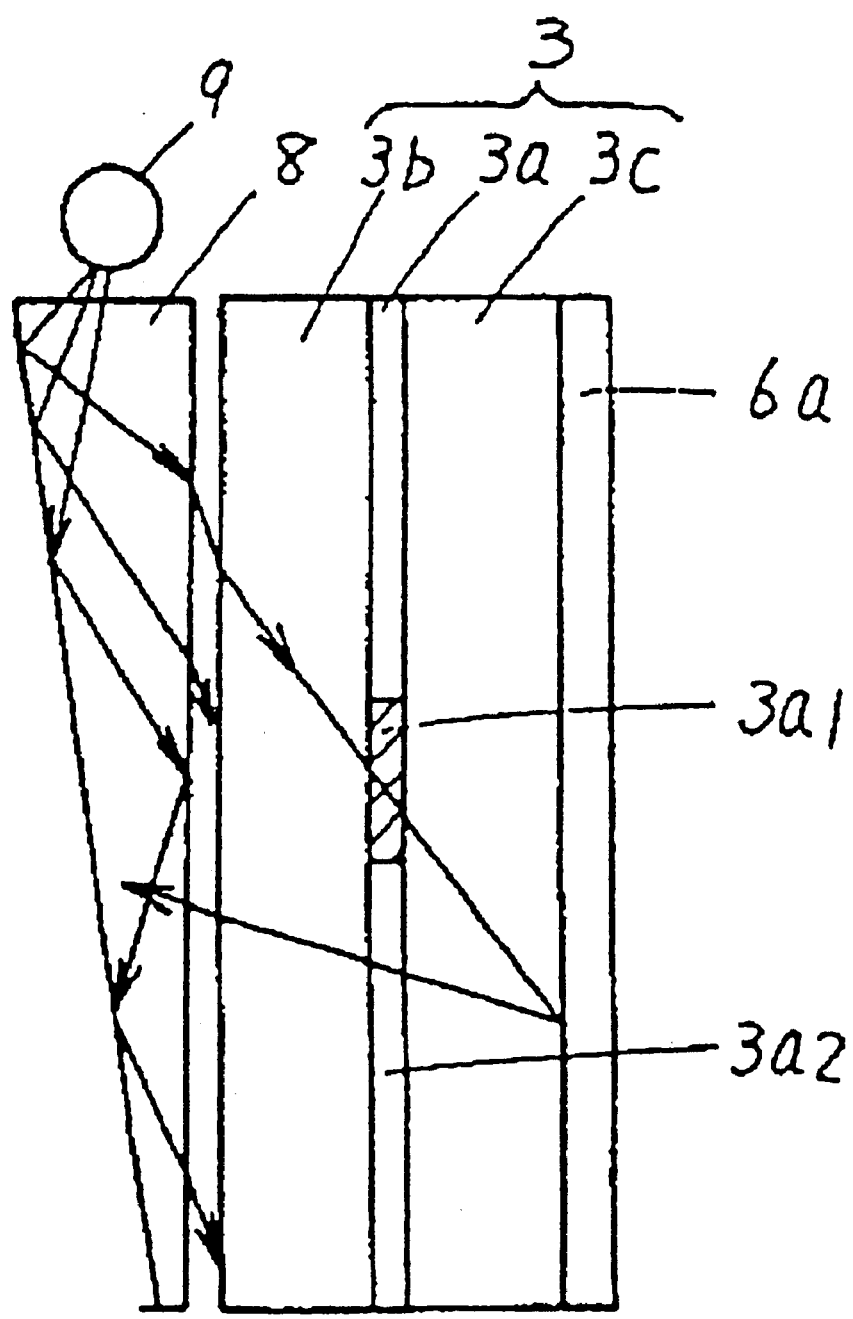
FIG. 8 is a fragmentary cross sectional elevation view illustrative of an eighth conventional non-luminescent display device.

The first present invention provides an illumination system for illuminating a light onto a display area of a display surface of a non-luminescent display device, wherein the illumination system is positioned outside of the display area and in a vicinity of an edge portion of the display surface, so that any part of the illumination system does not cover the display area.

In accordance with the first present invention, the illumination system is positioned outside of the display area and in a vicinity of an edge portion of the display surface, so that any part of the illumination system does not cover the display area, whereby any part of the illumination system does not prevent persons from viewing the display area.

A light emitted from the illumination system is transmitted through the non-luminescent display device and then reflected by a reflecting plate provided on a bottom side of said non-luminescent display device. Since any part of the illumination system does not cover the display area, no part of the reflected light is prevented in transmission from the display surface of the non-luminescent display device. This allows the non-luminescent display device to have a high efficiency in use of the light. This also allows the non-luminescent display system to have a high reflectivity of the incident light The high efficiency in use of the light as well as the high reflectivity and the high transparency of the light allows the required possible reduction in power consumption.

The illumination light is incident from only the displaying surface of the non-luminescent display device but no light is incident from the opposite surface to the display surface, for which reason the light reflecting plate provided on the opposite surface to the displaying surface of the non-luminescent display device is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the illumination system does not cover the display area, whereby transmission of any part of the reflected light is never prevented by the illumination system. The high efficiency in use of the light as well as the high transparency of the reflected light allows the required possible reduction in power consumption.

The illumination system provides illumination light to the non-luminescent display device so that the non-luminescent display device is allowed to exhibit high display performances free from a brightness of circumferences.

The illumination system results in that it is necessary for the above non-luminescent display to provide only a light reflecting plate on the opposite surface to the display surface of the non-luminescent display device. No provision is, however, required of any additional optical guide device for guiding the incident light as transmitted through the non-luminescent display device. This means it possible to reduce the manufacturing cost of the non-luminescent display system.

Furthermore, the illumination system is positioned in the vicinity of the edge portion of the display surface. Namely, the illumination light is emitted from a point or points which are not distanced from the displaying surface of the non-luminescent display device in a direction along the normal of a plane of the displaying surface. This means it possible to realize a size-reduced or compact non-luminescent display system.

It is preferable that the illumination system comprises at least a light source for emitting the light and at least a light reflecting device for reflecting the light transmitted from the light source toward the display area, and the at least light source and the at least light reflecting device are positioned outside of the display area and in a vicinity of edge portions of the display surface, so that the at least light source and the at least light reflecting device are distributed around circumferences of the display surface.

The provision of the at least light reflecting device and the at least light source as distributed around circumferences of the display surface allows uniform illumination of the light over the entire of the displaying area on the display surface of the non-luminescent display device.

The light reflecting device and the light source are positioned outside of the display area and in a vicinity of an edge portion of the display surface, so that any part of the light reflecting device and the light source does not cover the display area, whereby any part of the light reflecting device and the light source does not prevent persons from viewing the display area.

A light emitted from the light source is transmitted through the non-luminescent display device and then reflected by a reflecting plate provided on a bottom side of said non-luminescent display device. Since any part of the light reflecting device and the light source does not cover the display area, no part of he reflected light is prevented in transmission from the display surface of the non-luminescent display device This allows the non-luminescent display device to have a high efficiency in use of the light. This also allows the non-luminescent display system to have a high reflectivity of the incident light. The high efficiency in use of the light as well as the high reflectivity and the high transparency of the light allows the required possible reduction in power consumption.

The illumination light is incident from only the displaying surface of the non-luminescent display device but no light is incident from the opposite surface to the display surface, for which reason the light reflecting plate provided on the opposite surface to the displaying surface of the non-luminescent display device is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the light reflecting device and the light source does not cover the display area, whereby transmission of any part of the reflected light is never prevented by the illumination system. The high efficiency in use of the light as well as the high transparency of the reflected light allows the required possible reduction in power consumption.

The light source provides illumination light to the non-luminescent display device so that the non-luminescent display device is allowed to exhibit high display performances free from a brightness of circumferences.

The above limited positions of light reflecting device and the light source result in that it is necessary for the above non-luminescent display to provide only a light reflecting plate on the opposite surface to the display surface of the non-luminescent display device. No provision is, however, required of any additional optical guide device for guiding the incident light as transmitted through the non-luminescent display device. This means it possible to reduce the manufacturing cost of the non-luminescent display system.

Furthermore, the light reflecting device and the light source are positioned in the vicinity of the edge portion of the display surface. Namely, the illumination light is emitted from a point or points which are not distanced from the displaying surface of the non-luminescent display device in a direction along the normal of a plane of the displaying surface. This means it possible to realize a size-reduced or compact non-luminescent display system.

It is further preferable that the illumination system comprises a plurality of the light sources and a plurality of the light reflecting devices, and the light sources are distributed symmetrically with reference to the display surface and also the light reflecting devices are also distributed symmetrically with reference to the display surface. This symmetrical arrangements of a plurality of the light sources and a plurality of the light reflecting devices further improves the uniformity of illuminations.

It is her more preferable that the display surface is rectangular-shaped, and the light sources are positioned in the vicinity of four comers of the display surface and the light reflecting devices are positioned in the vicinity of four sides of the display surface, and each of the light reflecting devices extends along each of the four sides of the display surface.

It is also preferable that the display surface is rectangular-shaped, and the illumination system comprises a pair of the light source and the light reflecting device, and the light source is positioned in the vicinity of one side of the display surface and the light reflecting device is positioned in the vicinity of an opposite side to the one side of the display surface.

It is also preferable that the light reflecting device extends along the opposite side of the display surface.

It is also preferable that the light source extends along the one side of the display surface.

It is also preferable that the illumination system comprises a plurality of light sources distributed around circumferences of the display surface for emitting the light.

In this case, the plural light sources are positioned outside of the display area and in a vicinity of an edge portion of the display surface, so that any part of the plural light sources does not cover the display area, whereby any part of the plural light sources does not prevent persons from viewing the display area.

Lights emitted from the plural light sources are transmitted through the non-luminescent display device and then reflected by a reflecting plate provided on a bottom side of said non-luminescent display device. Since any part of the plural light sources does not cover the display area, no part of the reflected light is prevented in transmission from the display surface of the non-luminescent display device. This allows the non-luminescent display device to have a high efficiency in use of the light. This also allows the non-luminescent display system to have a high reflectivity of the incident light. The high efficiency in use of the light as well as the high reflectivity and the high transparency of the light allows the required possible reduction in power consumption.

The illumination lights are incident from only the displaying surface of the non-luminescent display device but no light is incident from the opposite surface to the display surface, for which reason the light reflecting plate provided on the opposite surface to the displaying surface of the non-luminescent display device is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the plural light sources does not cover the display area, whereby transmission of any part of the reflected light is never prevented by the plural light sources. The high efficiency in use of the light as well as the high transparency of the reflected light allows the required possible reduction in power consumption.

The plural light sources provide illumination lights to the non-luminescent display device so that the non-luminescent display device is allowed to exhibit high display performances free from a brightness of circumferences.

The above mentioned positions of the plural light sources result in that it is necessary for the above non-luminescent display to provide only a light reflecting plate on the opposite surface to the display surface of the non-luminescent display device. No provision is, however, required of any additional optical guide device for guiding the incident light as transmitted through the non-luminescent display device. This means it possible to reduce the manufacturing cost of the non-luminescent display system.

Furthermore, the plural light sources are positioned in the vicinity of the edge portion of the display surface. Namely, the illumination light is emitted from a point or points which are not distanced from the displaying surface of the non-luminescent display device in a direction along the normal of a plane of the displaying surface. This means it possible to realize a size-reduced or compact non-luminescent display system.

It is also preferable that the plurality of light sources are distributed symmetrically with reference to the display surface.

It is also preferable that the display surface is rectangular-shaped, and the light sources are positioned in the vicinity of four corners of the display surface.

The above first present invention is applicable to a first novel non-luminescent display system comprising: a non-luminescent display device having a display surface having a display area and an opposite surface to the display surface; a light reflecting plate extending along the opposite surface of the non-luminescent display device; and the above novel illumination system in accordance with the first present invention.

The second present invention provides a second novel non-luminescent display system comprising: a non-luminescent display device having a display surface having a display area and an opposite surface to the display surface, and the display surface being rectangular-shaped; a light reflecting plate extending along the opposite surface of the non-luminescent luminescent display device; and a plurality of light sources positioned in the vicinity of four corners of the display surface and outside of the display area so that any part of the light sources does not cover the display area.

In this case, the plural light sources are positioned outside of the display area and in a vicinity of an edge portion of the display surface, so that any part of the plural light sources does not cover the display area, whereby any part of the plural light sources does not prevent persons from viewing the display area.

Lights emitted from the plural light sources are transmitted through the non-luminescent display device and then reflected by a reflecting plate provided on a bottom side of said non-luminescent display device. Since any part of the plural light sources does not cover the display area, no part of the reflected light is prevented in transmission from the display surface of the non-luminescent display device. This allows the non-luminescent display device to have a high efficiency in use of the light. This also allows the non-luminescent display system to have a high reflectivity of the incident light. The high efficiency in use of the light as well as the high reflectivity and the high transparency of the light allows the required possible reduction in power consumption.

The illumination lights are incident from only the displaying surface of the non-luminescent display device but no light is incident from the opposite surface to the display surface, for which reason the light reflecting plate provided on the opposite surface to the displaying surface of the non-luminescent display device is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the plural light sources does not cover the display area, whereby transmission of any part of the reflected light is never prevented by the plural light sources. The high efficiency in use of the light as well as the high transparency of the reflected light allows the required possible reduction in power consumption.

The plural light sources provide illumination lights to the non-luminescent display device so that the non-luminescent display device is allowed to exhibit high display performances free from a brightness of circumferences.

The above mentioned positions of the plural light sources result in that it is necessary for the above non-luminescent display to provide only a light reflecting plate on the opposite surface to the display surface of the non-luminescent display device. No provision is, however, required of any additional optical guide device for guiding the incident light as transmitted through the non-luminescent display device. This means it possible to reduce the manufacturing cost of the non-luminescent display system.

Furthermore, the plural light sources are positioned in the vicinity of the edge portion of the display surface. Namely, the illumination light is emitted from a point or points which are not distanced from the displaying surface of the non-luminescent display device in a direction along the normal of a plane of the displaying surface. This means it possible to realize a size-reduced or compact non-luminescent display system.

The third present invention provides a third novel non-luminescent display system comprising: a non-luminescent display device having a display surface having a display area and an opposite surface to the display surface, and the display surface being rectangular-shaped; a light reflecting plate extending along the opposite surface of the non-luminescent display device; at least a light source positioned in the vicinity of a first edge portion of the display surface and outside of the display area so that any part of the at least light source does not cover the display area; and at least a light reflecting device positioned in the vicinity of a second edge portion opposite to the first edge portion of the display surface and outside of the display area so that any part of the at least light reflecting device does not cover the display area.

The provision of the at least light reflecting device and the at least light source as distributed around circumferences of the display surface allows uniform illumination of the light over the entire of the displaying area on the display surface of the non-luminescent display device.

The light reflecting device and the light source are positioned outside of the display area and in a vicinity of an edge portion of the display surface, so that any part of the light reflecting device and the light source does not cover the display area, whereby any part of the light reflecting device and the light source does not prevent persons from viewing the display area.

A light emitted from the light source is transmitted through the non-luminescent display device and then reflected by a reflecting plate provided on a bottom side of said non-luminescent display device. Since any part of the light reflecting device and the light source does not cover the display area, no part of the reflected light is prevented in transmission from the display surface of the non-luminescent display device. This allows the non-luminescent display device to have a high efficiency in use of the light. This also allows the non-luminescent display system to have a high reflectivity of the incident light. The high efficiency in use of the light as well as the high reflectivity and the high transparency of the light allows the required possible reduction in power consumption.

The illumination light is incident from only the displaying surface of the non-luminescent display device but no light is incident from the opposite surface to the display surface, for which reason the light reflecting plate provided on the opposite surface to the displaying surface of the non-luminescent display device is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the light reflecting device and the light source does not cover the display area, whereby transmission of any part of the reflected light is never prevented by the illumination system. The high efficiency in use of the light as well as the high transparency of the reflected light allows the required possible reduction in power consumption.

The light source provides illumination light to the non-luminescent display device so that the non-luminescent display device is allowed to exhibit high display performances free from a brightness of circumferences.

The above limited positions of light reflecting device and the light source result in that it is necessary for the above non-luminescent display to provide only a light reflecting plate on the opposite surface to the display surface of the non-luminescent display device. No provision is, however, required of any additional optical guide device for guiding the incident light as transmitted through the non-luminescent display device. This means it possible to reduce the manufacturing cost of the non-luminescent display system.

Furthermore, the light reflecting device and the light source are positioned in the vicinity of the edge portion of the display surface. Namely, the illumination light is emitted from a point or points which are not distanced from the displaying surface of the non-luminescent display device in a direction along the normal of a plane of the displaying surface. This means it possible to realize a size-reduced or compact non-luminescent display system.

Figure 9:
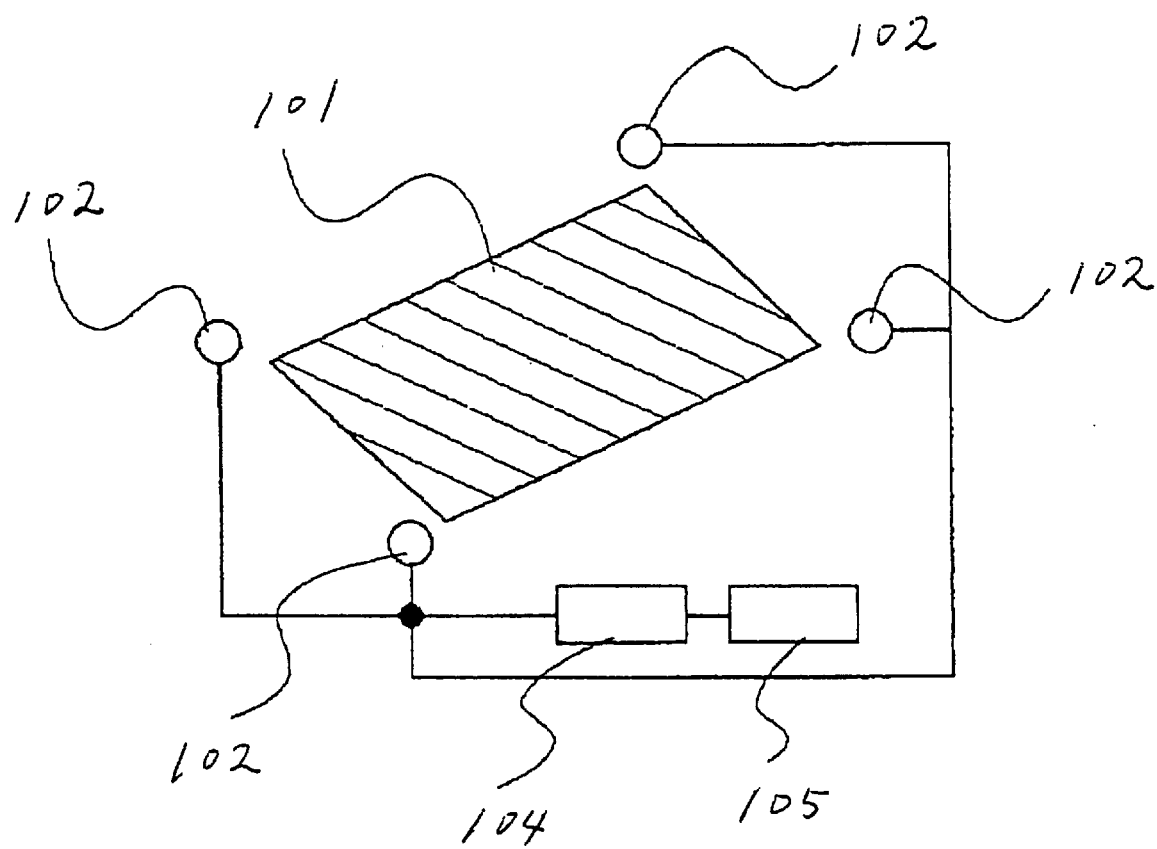
FIG. 9 is a diagram illustrative of a first novel non-luminescent display in a first embodiment in accordance with the present invention.
Figure 10:
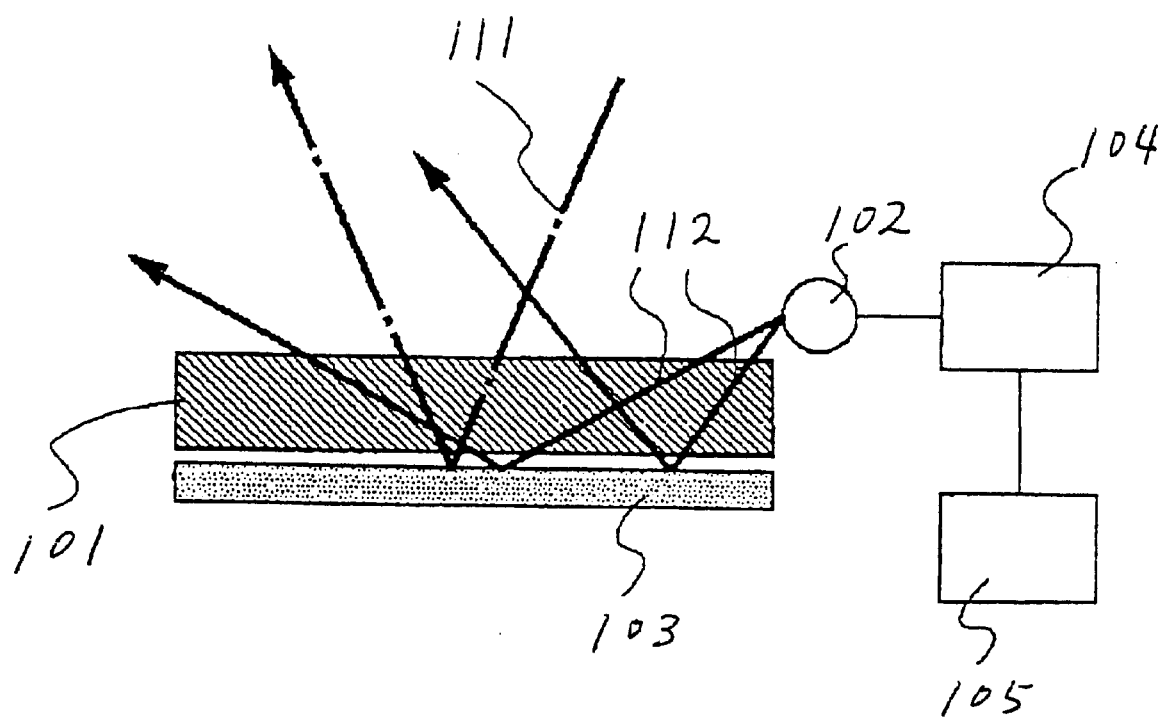
FIG. 10 is a fragmentary cross sectional elevation view illustrative of transmissions of natural and illumination lights in a first novel non-luminescent display in a first embodiment in accordance with the present invention.

A first embodiment according to the present invention will be described in detail with reference to FIGS. 9 and 10. FIG. 9 is a diagram illustrative of a first novel non-luminescent display in a first embodiment in accordance with the present invention. FIG. 10 is a fragmentary cross sectional elevation view illustrative of transmissions of natural and illumination lights in a first novel non-luminescent display in a first embodiment in accordance with the present invention. The novel non-luminescent display system has a non-luminescent display device 101 having a display surface having a display area and an opposite surface to the display surface. The display surface is rectangular-shaped. The novel non-luminescent display system also has a light reflecting plate 103 extending along the opposite surface of the non-luminescent display device 101. Four of light sources 102 are positioned in the vicinity of four corners of the display surface of the non-luminescent display device 101 and outside of the display area of the non-luminescent display device 101 so that any part of the light sources 102 does not cover the display area. The light sources 102 are connected to a single light-on circuit 104 which is also connected to a switch 105. Upon turning switch 105 ON, the light sources 102 emit illuminations lights 112 which are transmitted through the non-luminescent display device 101 as an incident light at small incident angles as illustrated in FIG. 10. The incident illumination lights 112 are then reflected by the light reflecting plate 103. The reflected illumination lights 112 are then transmitted through the non-luminescent display device 101 to the displaying surface of the non-luminescent display device 101. A natural light 111 is also incident into the non-luminescent display device 101 and then reflected by the light reflecting plate 103. Namely, the natural light 111 and the illumination light 112 are transmitted from the displaying surface of the non-luminescent display device 101. If the natural light 111 has a sufficient intensity, it is unnecessary to turn the switch 105 ON.

In this case, the four light sources 102 are positioned outside of the display area and in a vicinity of an edge portion of the display surface, so that any part of the plural light sources does not cover the display area of the non-luminescent display device 101, whereby any part of the plural light sources 102 does not prevent persons from viewing the display area of the non-luminescent display device 101.

Illumination lights 112 emitted from the four light sources 102 are transmitted through the non-luminescent display device 101 and then reflected by the reflecting plate 103. Since any part of the four light sources 103 does not cover the display area of the non-luminescent display device 101, no part of the reflected illumination light 112 is prevented in transmission from the display surface of the non-luminescent display device 101. This allows the non-luminescent display device 101 to have a high efficiency in use of the light This also allows the non-luminescent display system to have a high reflectivity of the incident light. The high efficiency in use of the light as well as the high reflectivity and the high transparency of the light allows the required possible reduction in power consumption.

The illumination lights 112 are incident from only the displaying surface of the non-luminescent display device 101 but no light is incident from the opposite surface to the display surface, for which reason the light reflecting plate 103 provided on the opposite surface to the displaying surface of the non-luminescent display device 101 is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the four light sources 102 does not cover the display area, whereby transmission of any part of the reflected light is never prevented by the four light sources 102. The high efficiency in use of the light as well as the high transparency of the reflected light allows the required possible reduction in power consumption.

The four light sources 102 provide the illumination lights 112 to the non-luminescent display device 101 so that the non-luminescent display device 101 is allowed to exhibit high display performances free from a brightness of circumferences or the intensity of the natural light 111.

The above mentioned positions of the four light sources 102 result in that it is necessary for the above non-luminescent display to provide only the single light reflecting plate 103 on the opposite surface to the display surface of the non-luminescent display device 101. No provision is, however, required of any additional optical guide device for guiding the incident light as transmitted through the non-luminescent display device 101. This means it possible to reduce the manufacturing cost of the non-luminescent display system.

Furthermore, the four light sources 102 are positioned in the vicinity of the edge portion of the display surface of the non-luminescent display device 101. Namely, the illumination lights 112 are emitted from points which are not distanced from the displaying surface of the non-luminescent display device 101 in a direction along the normal of a plane of the displaying surface. This means it possible to realize a size-reduced or compact non-luminescent display system.

Figure 11:
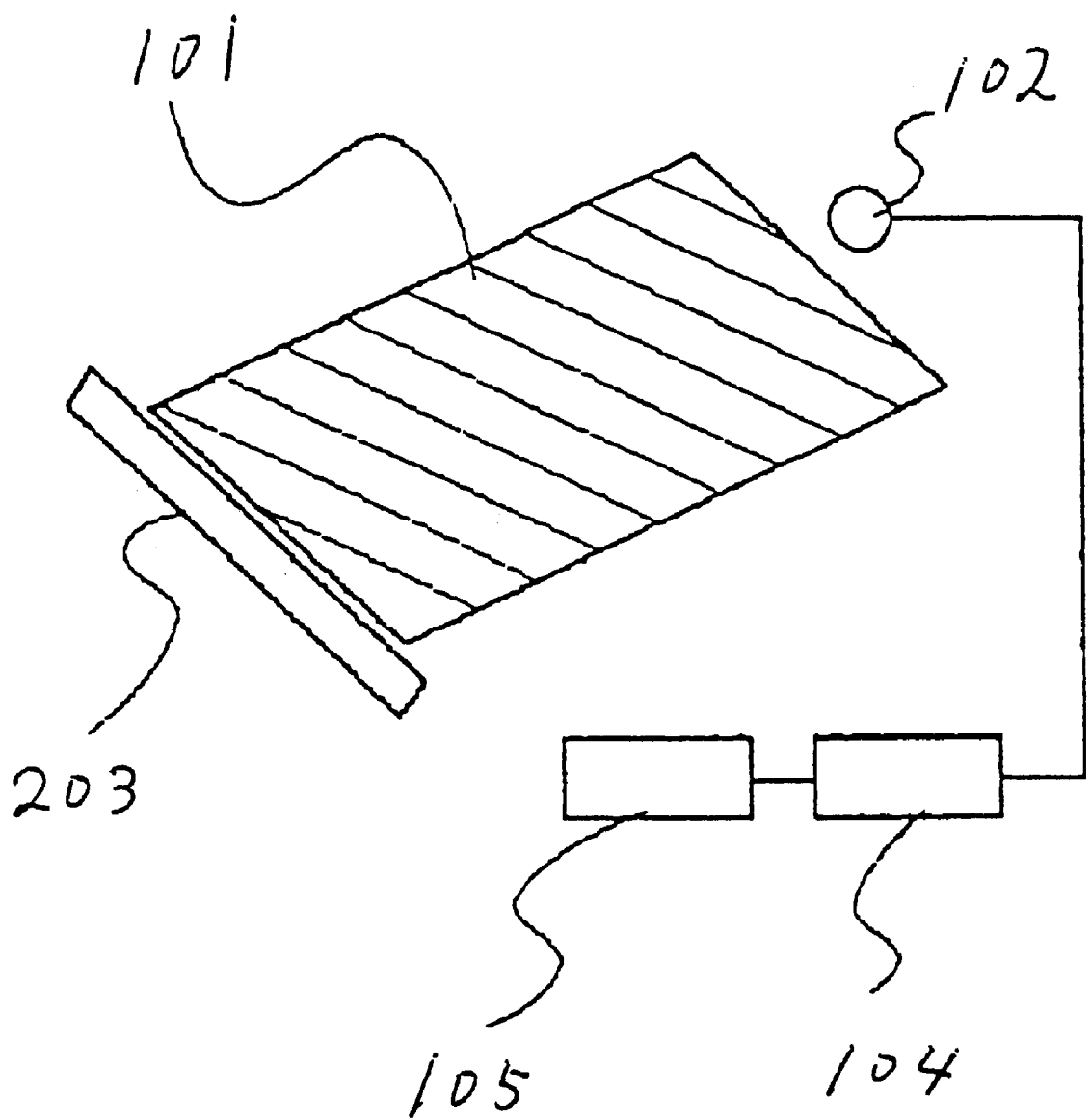
FIG. 11 is a diagram illustrative of a second novel non-luminescent display in a second embodiment in accordance with the present invention.
Figure 12:
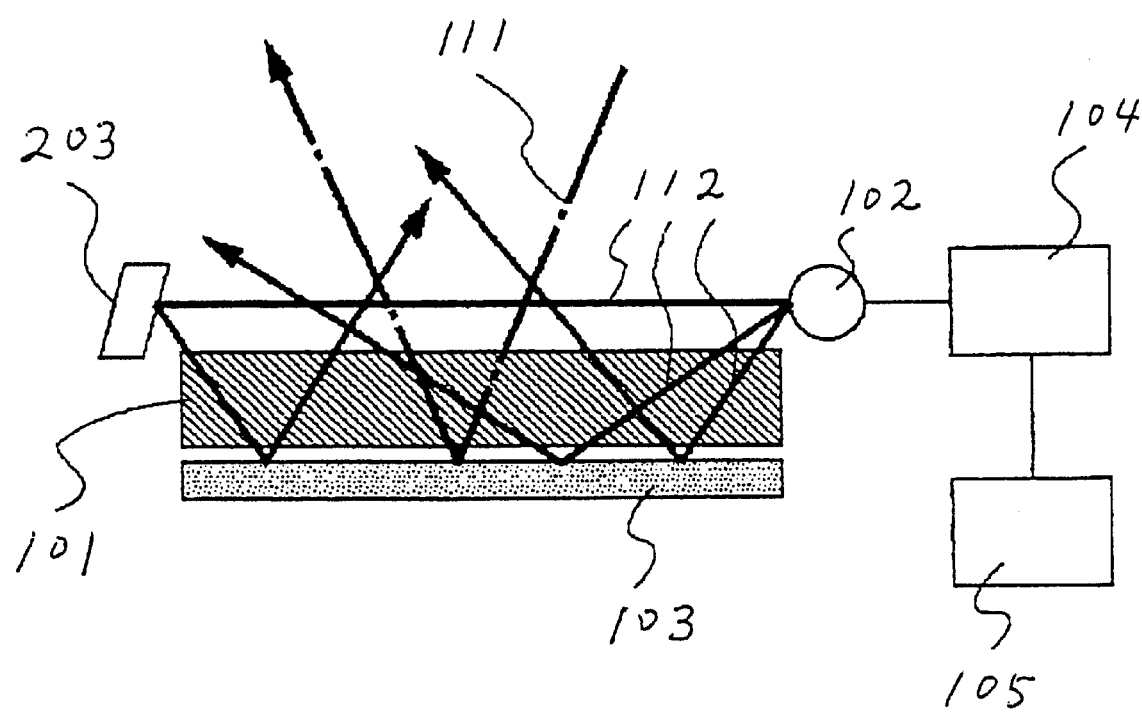
FIG. 12 is a fragmentary cross sectional elevation view illustrative of transmissions of natural and illumination lights in a second novel non-luminescent display in a second embodiment in accordance with the present invention.

A second embodiment according to the present invention will be described in detail with reference to FIGS. 11 and 12. FIG. 11 is a diagram illustrative of a second novel non-luminescent display in a second embodiment in accordance with the present invention. FIG. 12 is a fragmentary cross sectional elevation view illustrative of transmissions of natural and illumination lights in a second novel non-luminescent display in a second embodiment in accordance with the present invention.

The novel non-luminescent display system has a non-luminescent display device 101 having a display surface having a display area and an opposite surface to the display surface. The display surface is rectangular-shaped. A light reflecting plate 103 extends along the opposite surface of the non-luminescent display device 101. A single light source 102 is positioned in the vicinity of a first edge portion of the display surface of the non-luminescent display device 101 and outside of the display area of the non-luminescent display device 101, so that any part of the single light source 102 does not cover the display area of the non-luminescent display device 101. A single light reflecting mirror 203 is positioned in the vicinity of a second edge portion opposite to the first edge portion of the display surface of the non-luminescent display device 101 and outside of the display area of the non-luminescent display device 101, so that any part of the light reflecting mirror 203 does not cover the display area of the non-luminescent display device 101. The light source 102 is connected to a single light-on circuit 104 which is also connected to a switch 105. Upon turning switch 105 ON, the light source 102 emits illumination lights 112 which are transmitted through the non-luminescent display device 101 as an incident light at small incident angles as illustrated in FIG. 12. The incident illumination lights 112 are then reflected by the light reflecting plate 103. The reflected illumination lights 112 are then transmitted through the non-luminescent display device 101 to the displaying surface of the non-luminescent display device 101 natural light 111 is also incident into the non-luminescent display device 101 and then reflected by the light reflecting plate 103. Namely, the natural light 111 and the illumination light 112 are transmitted from the displaying surface of the non-luminescent display device 101. If the natural light 111 has a sufficient intensity, it is, unnecessary to turn the switch 105 ON.

The provision of the light reflecting mirror 203 and the light source 102 positioned along the opposite sides of the display surface of the non-luminescent display device 101 allows uniform illumination of the light over the entire of the displaying area on the display surface of the non-luminescent display device 101.

The light reflecting mirror 203 and the light source 102 are positioned outside of the display area of the non-luminescent display device 101 and in a vicinity of an edge portion of the display surface of the non-luminescent display device 101, so that any part of the light reflecting mirror 203 and the light source 102 does not cover the display area, whereby any part of the light reflecting mirror 203 and the light source 102 does not prevent persons from viewing the display area.

A part of the illumination light 112 emitted from the light source 102 is directly incident into the of the non-luminescent display device 101 and remaining part of the illumination light 112 is transmitted to the light reflecting mirror 203 and then reflected by the light reflecting or 203. The reflected illumination light 112 by the light reflecting mirror 203 is then incident into the non-luminescent display device 101. The illumination lights 112 are then reflected by the reflecting plate 103 provided on a bottom side of said non-luminescent display device 101. Since any part of the light reflecting mirror 203 and the light source 102 does not cover the display area of the non-luminescent display device 101, no part of the reflected light 112 by the light reflecting plate 103 is prevented transmission from the display surface of the non-luminescent display device 101. This allows the non-luminescent display device to have a high efficiency in use of the light. This also allows the non-luminescent display system to have a high reflectivity of the incident lights. The high efficiency in use of the light as well as the high reflectivity and the high transparency of the light allows the required possible reduction in power consumption.

The illumination light 112 is incident from only the displaying surface of the non-luminescent display device but no light is incident from the opposite surface to the display surface of the non-luminescent display device 101, for which reason the light reflecting plate 103 provided on the opposite surface to the displaying surface of the non-luminescent display device 101 is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the light reflecting mirror 203 and the light source 102 does not cover the display area of the non-luminescent display device 101, whereby transmission of any part of the reflected light is never prevented by the illumination system. The high efficiency in use of the light as well as the high transparency of the reflected light allows the required possible reduction in power consumption.

The light source 102 provides illumination light to the non-luminescent display device so that the non-luminescent display device 101 is allowed to exhibit high display performances free from a brightness of circumferences.

The above limited positions of light reflecting mirror 203 and the light source 102 result in that it is necessary for the above non-luminescent display to provide only a light reflecting plate 103 on the opposite surface to the display surface of the non-luminescent display device 101. No provision is, however, required of any additional optical guide device for guiding the incident light as transmitted through the non-luminescent display device. This means it possible to reduce the manufacturing cost of the non-luminescent display system.

Furthermore, the light reflecting mirror 203 and the light source 102 are positioned in the vicinity of the edge portion of the display surface. Namely, the illumination light is emitted from a point which is not distanced from the displaying surface of the non-luminescent display device in a direction along the normal of a plane of the displaying surface. This means it possible to realize a size-reduced or compact non-luminescent display system.

Figure 13:
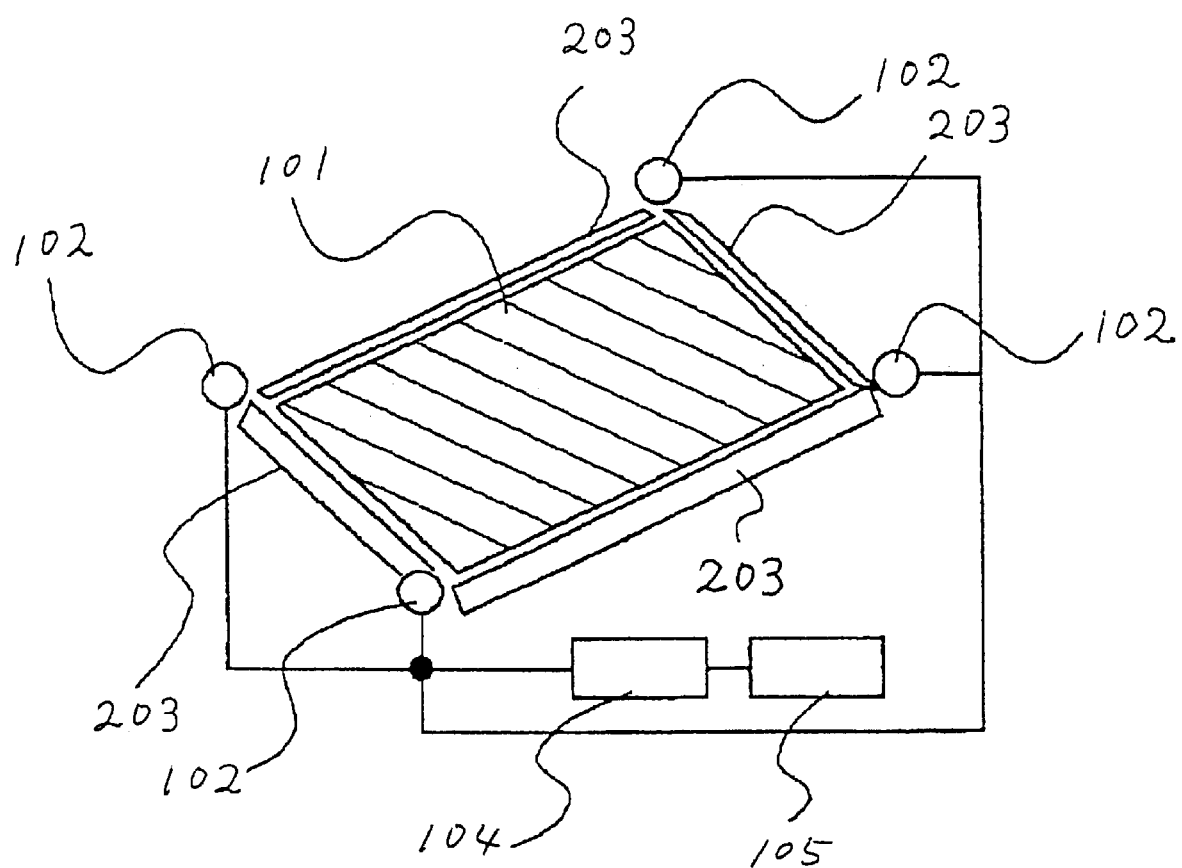
FIG. 13 is a diagram illustrative of a third novel non-luminescent display in a third embodiment in accordance with the present invention.

A third embodiment according to the present invention will be desrcibed in detail with reference to FIG. 13 which is a diagram illustrative of a third novel non-luminescent display in a third embodiment in accordance with the present invention.

The novel non-luminescent display system has a non-luminescent display device 101 having a display surface having a display area and as opposite surface to the display surface. The display surface is rectangular-shaped. A light reflecting plate 103 extends along the opposite surface of the non-luminescent display device 101. Four single light sources 102 are positioned in the vicinity of four corners of the display surface of the non-luminescent display device 101 and outside of the display area of the non-luminescent display device 101, so that any part of the single light sources 102 does not cover the display area of the non-luminescent display device 101. Four light reflecting mirrors 203 are positioned in the vicinity of four sides of the display surface of the non-luminescent display device 101 and outside of the display area of the non-luminescent display device 101, so that any part of the light reflecting mirrors 203 does not cover the display area of the non-luminescent display device 101. The light sources 102 are connected to a single light-on circuit 104 which is also connected to a switch 105. Upon turning switch 105 ON, the light sources 102 emit illumination lights 112 which are transmitted through the non-luminescent display device 101 as an incident light at small incident angles as illustrated in FIG. 13. The incident illumination lights 112 are then reflected by the light reflecting plate 103. The reflected illumination lights 112 are then transmitted through the non-luminescent display device 101 to the displaying surface of the non-luminescent display device 101. A natural light is also incident into the non-luminescent display device 101 and then reflected by the light reflecting plate 103. Namely, the natural light and the illumination light 112 are transmitted from the displaying surface of the non-luminescent display device 101. If the natural light has a sufficient intensity, it is unnecessary to turn the switch 105 ON.

The provision of the light reflecting mirrors 203 positioned in the vicinity of the four corners of the display surface of the non-luminescent display device 101 and the light sources 102 positioned along the four sides of the display surface of the non-luminescent display device 101 allows highly uniform illumination of the illumination light over the entire of the displaying area on the display surface of the non-luminescent display device 101.

The light reflecting mirrors 203 and the light sources 102 are positioned outside of the display area of the non-luminescent display device 101 and in a vicinity of an edge portion of the display surface of the non-luminescent display device 101, so that any part of the light reflecting mirrors 203 and the light sources 102 does not cover the display area of the non-luminescent display device 101, whereby any part of the light reflecting mirrors 203 and the light sources 102 does not prevent persons from viewing the display area.

A part of the illumination lights 112 emitted from the light sources 102 is directly incident into the of the non-luminescent display device 101 and remaining part of the illumination lights 112 is transmitted to the light reflecting mirrors 203 and then reflected by the light reflecting mirrors 203. The reflected illumination lights 112 by the light reflecting mirrors 203 are then incident into the non-luminescent display device 101. The illumination lights 112 are then reflected by the reflecting plate 103 provided on a bottom side of said non-luminescent display device 101. Since any part of the light reflecting mirrors 203 and the light sources 102 does not cover the display area of the non-luminescent display device 101, no part of the reflected light 112 by the light reflecting plate 103 is prevented in transmission from the display surface of the non-luminescent display device 101 This allows the non-luminescent display device to have a high efficiency in use of the light. This also allows the non-luminescent display system to have a high reflectivity of the incident lights. The high efficiency in use of the light as well as the high reflectivity and the high transparency of the light allows the required possible reduction in power consumption.

The illumination light 112 is incident from only the displaying surface of the non-luminescent display device but no light is incident from the opposite surface to the display surface of the non-luminescent display device 101, for which reason the light reflecting plate 103 provided on the opposite surface to the displaying surface of the non-luminescent display device 101 is allowed to have a high reflectivity and a low or no transparency of the light so as to allow the non-luminescent display system to have an increased reflectivity to the incident light. This also allows the non-luminescent display system to have a high reflectivity of the incident light. The high efficiency in use of the light as well as the high reflectivity and the high transparency of the light allows the required possible reduction in power consumption.

Further, any part of the light reflecting mirrors 203 and the lights sources 102 does not cover the display area of the non-luminescent display device 101, whereby transmission of any part of the reflected light is never prevented by the illumination system. The high efficiency in use of the light as well as the high transparency of the reflected light allows the required possible reduction in power consumption.

The light sources 102 provide illumination lights to the non-luminescent display device 101 so that the non-luminescent display device 101 is allowed to exhibit high display performances free from a brightness of circumferences.

The above limited positions of light reflecting mirrors 203 and the light sources 102 result in that it is necessary for the above non-luminescent display to provide only a light reflecting plate 103 on the opposite surface to the display surface of the non-luminescent display device 101. No provision is, however, required of any additional optical guide device for guiding the incident light as transmitted through the non-luminescent display device. This means it possible to reduce the manufacturing cost of the non-luminescent display system.

Furthermore, the light reflecting mirrors 203 and the light sources 102 are positioned in the vicinity of the edge portion of the display surface. Namely, the illumination light is emitted from a point which is not distanced from the displaying surface of the non-luminescent display device in a direction along the normal of a plane of the displaying surface. This means it possible to realize a size-reduced or compact non-luminescent display system.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An illumination system for illuminating a display area of a rectangular display surface of a non-luminescent display device, comprising:

four light sources mounted near a perimeter of the rectangular display surface outside of the display area, each said light source being generally centered near a respective corner of the display surface; and four light reflecting devices mounted near the perimeter of the rectangular display surface entirely outside of the display area, wherein no said light reflecting device overlaps any of the light sources along the perimeter, each said reflecting device being centered along and generally coextensive with a side of the display surface;

wherein said illumination system is positioned so that no part of said illumination system covers said display area.

2. A non-luminescent display system comprising:

a non-luminescent display device having a display surface having a display area and an opposite surface to said display surface;

a light reflecting plate extending along said opposite surface of said non-luminescent display device; and an illumination system as claimed in claim 1.

3. An illumination system for illuminating a display area of a rectangular display surface of a non-luminescent display device, comprising:

four light sources mounted near a perimeter of the rectangular display surface outside of the display area, each of the light sources being generally centered near a respective corner of the rectangular display surface;

wherein said illumination system is positioned so that no part of said illumination system covers said display area, and wherein the illumination system is free of any reflector mounted entirely outside of the display area.

4. A non-luminescent display system comprising:

a non-luminescent display device having a rectangular display surface with a display area and an opposite surface to said display surface;

a light reflecting plate extending along said opposite surface of said non-luminescent display device;

four light sources mounted near a perimeter of the rectangular display surface outside of the display area, each of said light sources being generally centered near one of four corners of said display surface; and four light reflecting devices mounted near the perimeter of the rectangular display surface entirely outside of the display area, wherein no said light reflecting device overlaps any of the light sources along the perimeter, said light reflecting devices being centered along and generally coextensive with a side of said display surface;

wherein no part of either the at least one light source or the at least one light reflecting device covers said display area.

* * * * *